Dec. 7, 1948.  E. I. ANDERSON  2,455,639
GROUND SPEED INDICATOR UTILIZING DOPPLER EFFECT
Filed Oct. 26, 1943
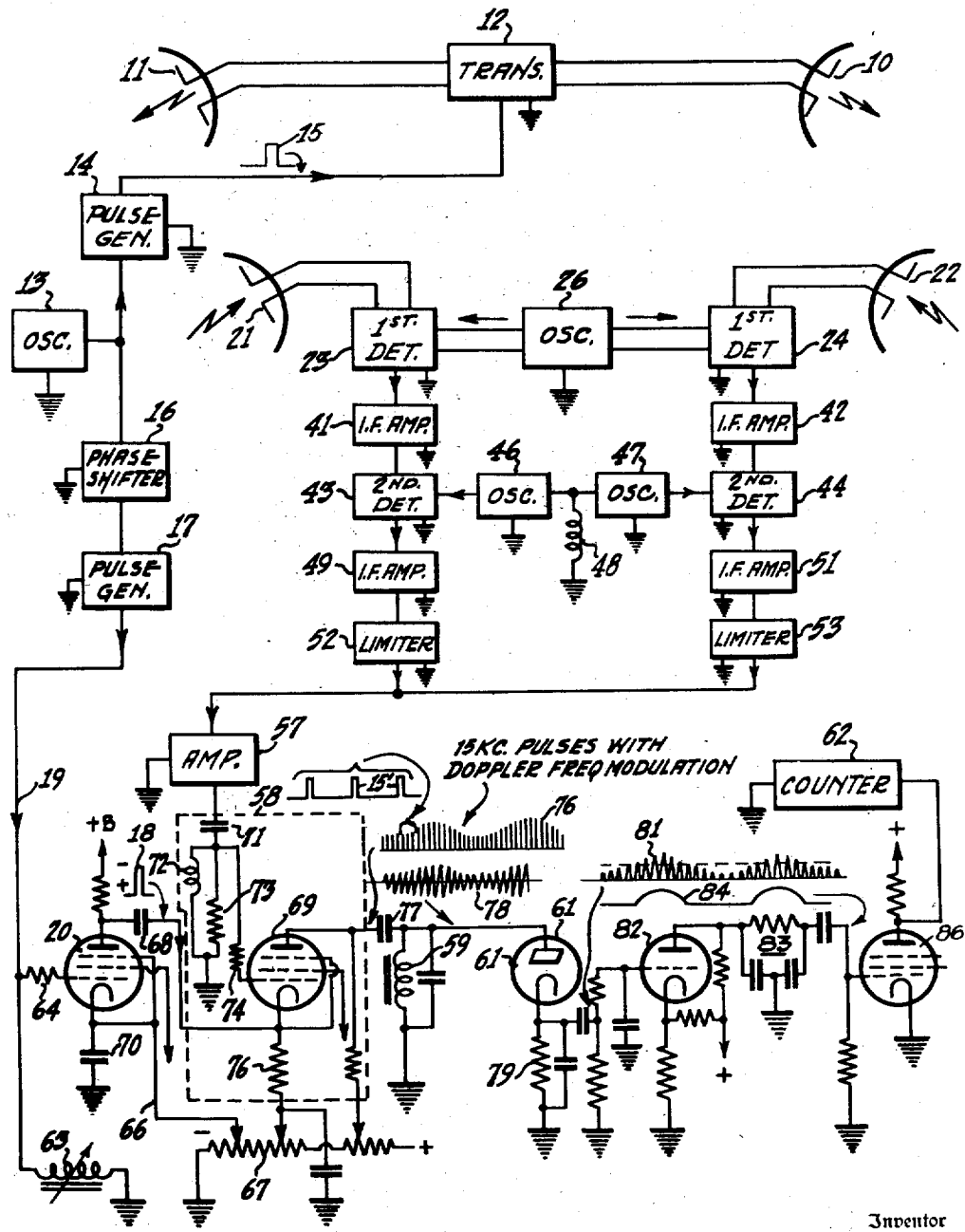
Inventor
EARL I. ANDERSON
By
Attorney Patented Dec. 7, 1948

2,455,639

UNITED STATES PATENT OFFICE 2,455,639

GROUND SPEED INDICATOR UTILIZING DOPPLER EFFECT

Earl I. Anderson, Manhasset, N. Y., assignor to Radio Corporation of America, a corporation of Delaware Application October 26, 1943, Serial No. 507,741

1 Claim. (Cl. 343—8)

My invention relates to systems for determining the relative speeds of objects and particularly to a system in which the Doppler effect is utilized for obtaining the speed or drift of an aircraft with respect to the earth.

A system of the above-mentioned type is described and claimed in a copending application Serial No. 352,845, filed August 16, 1940, in the name of Irving Wolff, and entitled Drift indicators, now Patent 2,403,625 issued July 9, 1946. The present invention is an improvement on the system described in the Wolff patent.

One object of the invention is to provide an improved receiver for a speed indicator system wherein radio waves are transmitted in different directions, received from these directions after reflection, and then reduced in frequency and beat with each other to determine the Doppler frequency.

Another object of the invention is to provide in a speed or drift indicator an improved method of and means for obtaining an indication of the Doppler frequency.

In one preferred embodiment of the invention pulses of radio energy are radiated toward the earth forwardly and rearwardly from an aircraft, and the pulses reflected from the earth at the front and at the rear of the aircraft are supplied to separate detectors and heterodyned to a lower frequency by means of a single oscillator which is common to the two detectors. The oscillator may be of a type having tuned plate and grid circuits, the plate circuit being coupled to one detector and the grid circuit being coupled to the other detector. Since the oscillator plate and grid circuits are substantially isolated from each other, the signal from one detector will not be fed through the common oscillator to the other detector to produce undesired beats. After being reduced in frequency the fore and aft reflected signals are supplied to a detector or mixer tube to obtain pulses that vary in amplitude at the Doppler or beat frequency rate.

In accordance with the present invention, the output of the above-mentioned mixer tube is applied to a tuned circuit that is resonant at the pulse repetition rate whereby there is obtained a sine wave signal (instead of recurring pulses) that varies in amplitude at the beat frequency rate. This sine wave signal is then detected, integrated or filtered, and supplied to a suitable frequency indicator or counter. By using a tuned circuit in this manner, it is comparatively easy to obtain Doppler frequency pulses of sufficient amplitude to operate the counter reliably.

The invention will be better understood from the following description taken in connection with the accompanying drawing in which the single figure is a circuit and block diagram of a system embodying the invention.

Referring to the drawing, radio pulses are radiated forwardly and downwardly from a directive antenna 10 and similar pulses are radiated rearwardly and downwardly from a directive antenna 11. The reflected pulses may be received by the same antennas 10 and 11 by utilizing suitable means for short-circuiting the lines to the receivers during the instant of pulse transmission. Such antenna duplexing means comprising spark gaps or glow tubes are well known in the art. In the example to be described, however, the use of separate receiving antennas will be assumed.

As will be explained hereinafter, only the pulses reflected from preselected points such as those 45 degrees ahead and behind the airplane are passed to the receivers and utilized in measuring the Doppler effect, this directional selection being accomplished by the use of "gating" pulses as described in the above-identified Wolff application. It may be noted that such gating is desirable because it is difficult to provide antennas that are suitable for installation on aircraft and which have a sufficiently narrow radiation pattern.

The antennas 10 and 11 (which are shown as dipoles in parabolic reflectors merely by way of example), are supplied with short pulses of high frequency radio energy from a transmitter 12. Such pulses may have a carrier frequency of 400 megacycles, a duration of about 0.3 microsecond, and a repetition rate of 15,000 per second. These pulses of high frequency energy are obtained by means of a 15,000 cycle sine wave oscillator 13 which is coupled to a pulse generator 14. The generator 14 produces short 15,000 cycle modulating pulses 15 for pulse modulating the transmitter 12.

Output signal from the oscillator 13 is also passed through a phase shifter 16 and supplied to a pulse generator 17 for producing time gate pulses 18. The pulses 18 have the same repetition rate as the modulating pulses 15 and may be of substantially the same duration. In the example being described they have a duration of 0.25 microsecond. Their use for obtaining directional selection will be described hereinafter.

The receiving system comprises directive receiving antennas 21 and 22 for receiving reflected pulses that have been radiated from the antennas 10 and 11, respectively. The signals from antennas 21 and 22 are supplied to the first detectors 23 and 24, respectively, where they are mixed with signal from a common local oscillator 26 to produce intermediate-frequency signals. The oscillator 26 may comprise push-pull grid and anode circuits in the form of tuned lines having shorting bars, the oscillator grid circuit being coupled to the grid circuit of the detector 23, and the oscillator anode circuit being coupled to the grid circuit of the detector 24 as described and claimed in copending application Serial No. 507,740, filed October 26, 1943, in the names of Earl I. Anderson and Allen Barco, and entitled Ground speed indicator, now Patent 2,422,064 issued June 10, 1947. In this way the detectors 23 and 24 are isolated with respect to each other even though they are supplied with mixing signal from an oscillator common to the two detectors. By employing a single oscillator in this way any difficulty resulting from changes in oscillator frequency is avoided. While it is feasible to lock together two comparatively low frequency oscillators as described below so that any frequency change in one will cause a corresponding frequency change in the other, this cannot be done satisfactorily with present oscillators operating at very high frequencies, such as frequencies in the region of 400 megacycles per second.

The I.-F. outputs from the first detectors 23 and 24 (which outputs will differ in frequency only by the amount of the Doppler effect) are passed through I.-F. amplifiers 41 and 42 to the second detectors 43 and 44, respectively. Here the I.-F. signals are again heterodyned to a lower frequency by means of the oscillators 46 and 47 which are coupled to the detectors 43 and 44, respectively. In order to hold the oscillators 46 and 47 exactly to the same frequency, each is locked in with the other by coupling them together through a common inductance coil 48. At this point in the circuit this may be done satisfactorily because of the lower frequency involved.

The I.-F. outputs of the second detectors 43 and 44 are passed through I.-F. amplifiers 49 and 51 and through amplitude limiters 52 and 53, respectively. The outputs of the limiters 52 and 53 are supplied through an amplifier 57 to a detector 58 which also has the time gate pulses 18 applied thereto.

The two I.-F. signals from the amplifier 57 beat with each other in the detector 58 whereby the detector output has a beat frequency that is the frequency difference resulting from the Doppler effect. The gating pulses 18 allow the detector 58 to pass only the signals reflected along the desired fore and aft 45 degree angle lines.

The output of detector 58 is applied to a circuit 59 tuned to the 15,000 cycle pulse repetition rate and then passed through rectifier 61 to obtain pulses of current occurring at the beat or Doppler frequency. The Doppler frequency pulses are then supplied to a suitable frequency indicating or counter circuit 62. The counter circuit 62 may be of the type commonly employed in radio altimeters of the frequency modulated type. The function and advantages of the tuned circuit 59 will be described hereinafter.

The keyer tube 20 comprises a pentode having in its grid circuit an adjustable inductance coil 63 to vary the pulse width and a resistor 64 for suppressing parasitic oscillations. The cathode is positively biased beyond cut-off by means of a connection 66 to a voltage divider 67, there being a bypass capacitor 70 connected between cathode and ground. A time gate pulse 18 of negative polarity is applied through a coupling capacitor 68 to the cathode of a pentode 69 to reduce its bias to the cut-off point during the pulse interval. It therefore operates as a time gate detector because it is in operative condition (at cut-off D.-C. bias) only when the pulse is applied and is substantially beyond cut-off at all other times.

The I.-F. pulses 15' corresponding to the fore and aft reflected pulses are applied from the amplifier 57 to the control grid of the pentode 69 through a coupling capacitor 71. These pulses are reflected from the earth's surface within a wide angle rather than from only a small surface area and along the two 45 degree lines only. Thus a reflected pulse appears at the receiver input as a pulse of comparatively long duration. The grid circuit of pentode 69 includes an inductance coil 72 for providing coupling impedance, the coil 72 being shunted by a resistor 73. An oscillation suppressor resistor 74 may be provided.

In the absence of a gate pulse 18, the tube 69 is biased beyond cut-off by a positive cathode bias that is applied from the voltage divider 67 through a cathode resistor 76. Therefore, the only reflected pulse signal that passes through the tube 69 is that which appears on its control grid simultaneously with the appearance of a gating pulse 18 on its cathode. By adjustment of the phase shifter 16 the pulse 18 can be made to occur at the proper time to pass only those reflected pulses that have traveled a certain specific distance, this distance being that along the 45 degree line in the particular example assumed.

Since the pentode 69 is to function as a detector for obtaining the Doppler or beat frequency of the fore and aft reflections, its cathode bias and the amplitude of the gate pulses 18 are properly adjusted to make the tube 69 act as a detector during the occurrence of each pulse 18.

The beat frequency output of the tube 69 is shown by the graph 76 and consists of the 15,000 cycle video pulses which vary in amplitude at the Doppler or beat frequency. These pulses are applied through a coupling capacitor 77 to the circuit 59 which is tuned to the pulse repetition rate of 15,000 cycles per second. Thus, as shown by the graph 78, there appears across the tuned circuit 59 a sine wave voltage of 15,000 cycles which varies in amplitude at the rate of the Doppler effect frequency. It should be understood that the Q of the tuned circuit 59 should be low enough to permit the amplitude of the sine wave voltage to follow the amplitude variations of the modulated pulses that are applied thereto.

The beat frequency modulated sine wave 78 is rectified by a diode or other suitable rectifier 81 whereby there appears across the output resistor 79 the rectified signal 81. The signal 81 is amplified by a triode 82 and integrated by a resistor-capacitor filter 83 to produce pulses 84 that recur at the Doppler frequency. The pulses 84 are then shaped (clipped) by a vacuum tube 86 and supplied to a suitable indicator or pulse counter 62.

By utilizing the tuned circuit 59, a large output is obtained since the narrow pulses of small energy content shown in graph 76 are converted by the tuned circuit 59 into voltage sine waves whose peak amplitude is still about as great as though a resistance load were used but whose integrated area is greater. Thus the usable energy output from the very narrow modulated pulses is increased by the tuned circuit 59 although the tuned circuit actually introduces the usual circuit loss. The invention may also be employed to advantage in other systems, such as a communication system, where it is desired to demodulate very narrow recurring pulses of small energy content that have been modulated either as to amplitude or as to width.

The use of the tuned circuit 59 also improves the signal-to-noise ratio as compared with that obtained when the tuned circuit 59 is replaced by a high impedance resistor. This is because the circuit 59 has low impedance to noise or ripples on the power supply so that most of the noise voltage appears across the comparatively high impedance coupling capacitor 77.

I claim as my invention:

In a system for determining the speed of an object with respect to a reflecting surface, means for radiating pulses of radio energy from said object in two directions, means for receiving in two separate channels the pulses received from said two directions after reflection from said surface, a detector in each of said channels, means for supplying heterodyning signals of like frequency to said detectors in the two channels for producing intermediate-frequency signals in said two channels, means for mixing said two intermediate-frequency signals to obtain pulses modulated by their beat frequency, a circuit which is resonant at the pulse repetition rate, means for applying said modulated pulses to said resonant circuit whereby a beat-frequency modulated sine wave signal is obtained, and means for rectifying said sine wave signal to obtain pulses recurring at the beat frequency.

EARL I. ANDERSON.

REFERENCES CITED

The following references are of record in the file of this patent:

UNITED STATES PATENTS

| Number | Name | Date |
|---|---|---|
| 1,545,940 | Cabot | July 14, 1925 |
| 1,564,627 | Round | Dec. 8, 1925 |
| 2,381,928 | Roberts | Aug. 14, 1945 |
| 2,403,625 | Wolff | July 9, 1946 |
| 2,416,286 | Busignies | Feb. 25, 1947 |